United States Patent
Jeon

(10) Patent No.: US 10,232,729 B2
(45) Date of Patent: Mar. 19, 2019

(54) APPARATUS AND METHOD FOR CONTROLLING CHARGING BATTERY

(71) Applicants: Hyundai Motor Company, Seoul (KR); Kia Motors Corporation, Seoul (KR)

(72) Inventor: Young Tak Jeon, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 21 days.

(21) Appl. No.: 15/608,703

(22) Filed: May 30, 2017

(65) Prior Publication Data

US 2018/0141455 A1 May 24, 2018

(30) Foreign Application Priority Data

Nov. 18, 2016 (KR) .......................... 10-2016-0154181

(51) Int. Cl.
| | |
|---|---|
| *B60L 11/18* | (2006.01) |
| *G01S 19/34* | (2010.01) |
| *G01S 19/37* | (2010.01) |
| *B60W 10/26* | (2006.01) |
| *B60L 1/08* | (2006.01) |
| *B60L 5/00* | (2006.01) |

(52) U.S. Cl.
CPC .............. *B60L 11/1862* (2013.01); *B60L 1/08* (2013.01); *B60L 11/1861* (2013.01); *B60L 11/1874* (2013.01); *B60W 10/26* (2013.01); *G01S 19/34* (2013.01); *G01S 19/37* (2013.01); *B60L 5/00* (2013.01); *B60L 2240/36* (2013.01); *B60L 2240/622* (2013.01); *B60L 2240/662* (2013.01)

(58) Field of Classification Search
CPC ......... B60W 10/26; G01S 19/34; G01S 19/37
USPC ........................................................ 320/132
See application file for complete search history.

(56) References Cited

U.S. PATENT DOCUMENTS

| | | | | |
|---|---|---|---|---|
| 5,596,261 | A * | 1/1997 | Suyama .............. | B60L 11/1803 320/109 |
| 5,650,710 | A * | 7/1997 | Hotta .................... | B60L 3/0046 320/128 |
| 5,686,812 | A * | 11/1997 | Hotta .................... | H02J 7/0031 320/109 |

(Continued)

FOREIGN PATENT DOCUMENTS

| | | |
|---|---|---|
| JP | 2002-264635 A | 9/2002 |
| JP | 2015-199429 A | 11/2015 |
| KR | 10-0802707 B1 | 2/2008 |

(Continued)

*Primary Examiner* — Sun Lin
(74) *Attorney, Agent, or Firm* — Morgan, Lewis & Bockius LLP

(57) ABSTRACT

A battery charging control apparatus of an electric vehicle includes an air conditioning control device that controls an operation of an air conditioning device, a control device that receives global positioning system (GPS) information of a user terminal, which approaches a vehicle, and to generate charging control information based on a distance that is determined based on the GPS information of the user terminal and location information of the vehicle, and a battery charging device that controls an amount of current to be supplied to a battery and the air conditioning control device, based on the charging control information.

13 Claims, 3 Drawing Sheets

(56) References Cited

U.S. PATENT DOCUMENTS 8,504,219 B2 8/2013 Kim et al.
2012/0101659 A1 4/2012 Kim et al.

FOREIGN PATENT DOCUMENTS

KR 10-2012-0041066 A 4/2012
KR 10-1181186 B1 9/2012
KR 10-2013-0143327 A 12/2013

* cited by examiner

| TIME | APPROACHING DISTANCE BETWEEN USER AND OWN VEHICLE | APPROACHING SPEED (M/MIN) | AMOUNT OF CURRENT DISTRIBUTED TO AIR CONDITIONING DEVICE |
|---|---|---|---|
| T0 | BEYOND 500 m | START TO CALCULATE APPROACHING SPEED UNTIL TIME APPROACHES T2 | DEFAULT DISTRIBUTION (E.G., 20 %) |
| T1 | 500m | 100m/m | — |
| T2 | 300m | 100m/m | INCREASE POWER DISTRIBUTION (E.G., 30 %) |
| T3 | 300m | 50m/m | POWER DISTRIBUTION * APPROACHING SPEED (E.G., 25 %) |
| T4 | 200m | 100m/m | INCREASE POWER DISTRIBUTION (E.G., 40 %) |
| ... | ... | ... | ... |
| T(N-1) | 50m | 50m/m | FULL DISTRIBUTION (E.G., 90 %) |
| TN | 0m | 0m/m | FULL DISTRIBUTION |

FIG. 3

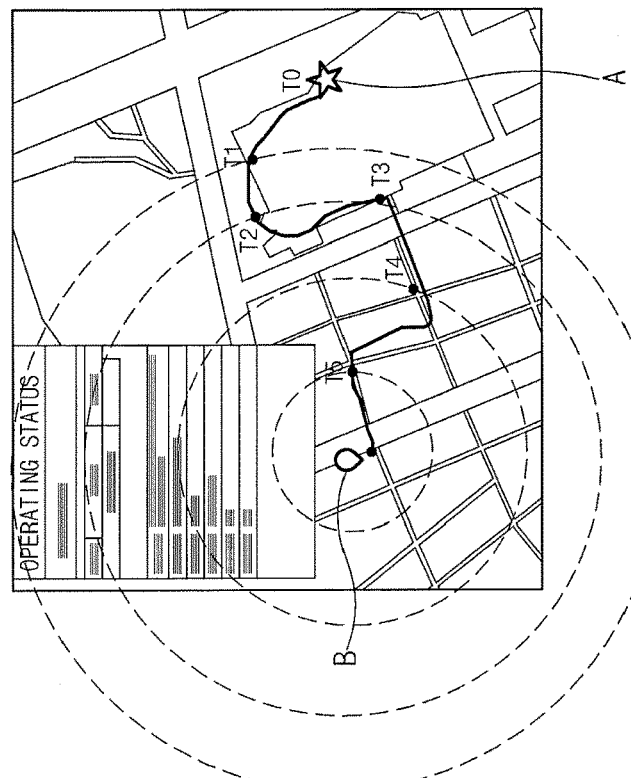

APPARATUS AND METHOD FOR CONTROLLING CHARGING BATTERY

CROSS-REFERENCE TO RELATED APPLICATION

The present application claims priority to Korean Patent Application No. 10-2016-0154181, filed on Nov. 18, 2016, the entire contents of which is incorporated herein for all purposes by this reference.

BACKGROUND OF THE INVENTION

Field of the Invention

The present invention relates to a battery charging control apparatus and a battery charging control method, and more particularly, to a technology of adjusting the amount of current supplied for charging a battery by using an approaching distance and an approaching speed between a user and the electric vehicle while the battery of an electric vehicle is charged.

Description of Related art

Generally, vehicles are divided into a gasoline vehicle, a diesel vehicle, a natural gas vehicle, a hybrid vehicle, and an electric vehicle, based on the fuels that the vehicles use.

A vehicle which uses fossil fuels from among the vehicles discharges various kinds of exhaust gases when the fossil fuels burn. Exhaust gases are known to damage natural surroundings, for example, climate change due to the global warming phenomenon, as well as damage to a person's respiratory system. Also, since the vehicle which uses the fossil fuels generates a noise when driving, people around the vehicle as well as occupants of the vehicle feel uncomfortable. To prevent the depletion of fossil fuels there is a need to develop alternative energy as fossil fuels are a consumable material of which the regeneration is impossible.

Accordingly, a hybrid vehicle has been developed to minimize the use of the fossil fuels. However, a hybrid vehicle is able to reduce the consumption of fossil fuels (approximately 50%) compared with a conventional vehicle that uses fossil fuels, but it is impossible to remove the exhaust gas as the hybrid vehicle still uses the combustion of fossil fuels.

Recently, electric vehicles using only electricity without using fossil fuels have been developed. Some of the fossil fuel free electric vehicles are commercially operated. An electric vehicle in which a battery is disposed operates by using electricity charged in battery. Since the electric vehicle minimizes noise and does not emit exhaust gases the electric vehicle conserves surroundings.

However, the driving distance of the electric vehicle is still restricted by battery limits.

Accordingly, ways to overcome the battery limits are required, but it is difficult to improve the performance of a battery. Accordingly, there is a need for a method of solving the above-mentioned problem without improving the performance of the battery.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

The present invention has been made to solve the above-mentioned problems occurring in the prior art while advantages achieved by the prior art are maintained intact.

An aspect of the present invention is directed to providing a battery charging control apparatus and a battery charging control method, and more particularly, a battery charging control apparatus that adjusts the amount of current direct to charging a battery by using the approaching distance and approaching speed between the user and the electric vehicle while the battery of an electric vehicle is charged, and a battery charging control method.

Other aspects and advantages of the present invention will be understood from the following description, and it will be apparently understood from an exemplary embodiment of the present invention. It will be easily understood that the objects and advantages of the invention are realized by means and combinations described in the appended claims.

According to various aspects of the present invention, a vehicle may include an air conditioning control device that controls an operation of an air conditioning device; a control device that receives global positioning system (GPS) information of a user terminal, which approaches a vehicle, and to generate charging control information based on a distance that is determined based on the GPS information of the user terminal and location information of the vehicle, and a battery charging device that controls an amount of current to be supplied to a battery and the air conditioning control device, based on the charging control information.

The battery charging device may determine a state of charge (SOC) of the battery and an estimated full-charging time by measuring an amount of charging current while the battery is charged, and transmits the determined result to the control device.

The battery charging control apparatus may be disposed in the vehicle and may communicate with a telematics server by using a communication device included in the vehicle.

The control device may generate the charging control information based on an approaching speed of the user terminal.

The telematics server may receive a remote control signal from the user terminal wherein the telematics server remotely controls the air conditioning control device.

As a distance determined based on the GPS information of the user terminal and the location information of the vehicle decreases, the control device may increase an amount of current distributed to the air conditioning control device and may decrease an amount of current distributed to the battery.

As a speed at which the user terminal approaches the vehicle increases based on the GPS information of the user terminal and the location information of the vehicle, the control device may increase an amount of current distributed to the air conditioning control device and may decrease an amount of current distributed to the battery.

According to another aspect of the present invention, a battery charging control method may include receiving, by a control device, GPS information of a user terminal through a telematics server, comparing the received GPS information of the user terminal with current location information of an own vehicle; determining an approaching distance between a location of the received GPS information of the user terminal and a current location of the own vehicle, and adjusting an amount of current to be supplied to a battery charging device and an air conditioning control device, based on the determined approaching distance.

The battery charging control method may further include that before the receiving of the GPS information of the user terminal, waking up, by the telematics server, the control device when the telematics server receives GPS information of a user from the user terminal.

The telematics server may control the air conditioning control device.

The battery charging control method may include when the approaching distance between a location of the GPS information of the user terminal and the current location of the own vehicle is smaller than a specified distance, increasing an amount of current to be supplied to the air conditioning control device and decreasing an amount of current to be supplied to the battery charging device.

The battery charging control method may further include determining an approaching speed based on the GPS information of the user terminal and the current location information of the own vehicle; and adjusting an amount of current to be supplied to the battery charging device and the air conditioning control device, based on the determined approaching speed.

The battery charging control method may further include increasing the amount of current supplied to the air conditioning control device and decreasing the amount of current supplied to the battery charging device, as the approaching speed at which the user terminal approaches the own vehicle increases based on the GPS information of the user terminal and the current location information of the own vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a drawing for describing a method of operating a battery charging control system, according to an exemplary embodiment of the present invention.

Figure 1:
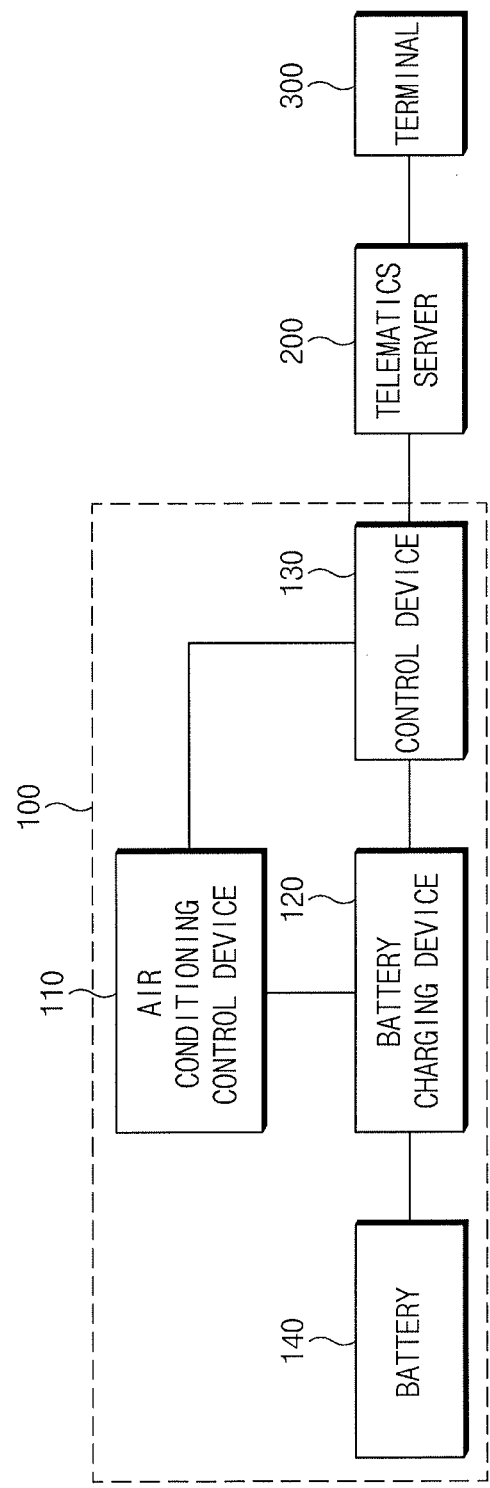
FIG. 1 is a drawing for describing a battery charging control system, according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention through the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, which may be included within the spirit and scope of the invention as defined by the appended claims.

In the drawings, embodiments of the inventive concept are not limited to the specific examples provided herein and are exaggerated for clarity. The terminology used herein is for describing embodiments only and is not intended to limit the invention.

As used herein, the term "and/or" includes any and all combinations of one or more of the associated listed items. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the singular terms "a," "an" and "the" are intended to include the plural forms as well, unless the context clearly indicates otherwise. Furthermore, it will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof.

Below, embodiments will be described in detail with reference to accompanying drawings.

FIG. 1 is a drawing for describing a battery charging control system, according to an exemplary embodiment of the present invention.

Referring to FIG. 1, a battery charging control system of an electric vehicle of FIG. 1 may include a battery charging control apparatus 100, a telematics server 200, and a terminal 300.

The battery charging control apparatus 100 is disposed in a vehicle and may communicate with the telematics server 200 through a communication device (a communication module) included in the vehicle. For example, the communication device may be a head device included in the vehicle.

In addition, when an electric vehicle enters a charging station, the battery charging control apparatus 100 may communicate with the telematics server 200 through a wireless repeater (e.g., access point (AP)) or a mobile communication (e.g., code division multiple access (CDMA) or wideband CDMA (WCDMA)) repeater that is disposed in the charging station.

The battery charging control apparatus 100 may transmit a signal, which provides notification of the corresponding fact at a point in time when a battery starts to be charged and the battery is fully charged, to the telematics server 200. The battery charging control apparatus 100 may send battery charging information, which may include information about a SOC of the battery while the battery is charged and information about an estimated full-charging time, and information about current indoor and outdoor temperatures of a vehicle to the telematics server 200 by using a wireless communication network.

Furthermore, the battery charging control apparatus 100 may receive GPS information of the user terminal 300 from the telematics server 200. The battery charging control apparatus 100 is configured to control each of an air conditioning control device and a battery charging device based on an approaching distance and an approaching speed (a speed at which the user terminal 300 approaches the vehicle) that is determined by using the received GPS information of terminal (the user terminal, 300) and a location of an own vehicle. The battery charging control apparatus 100 adjusts the indoor temperature of the vehicle by adjusting an amount of current to be supplied to the air conditioning control device and adjusts an amount of current to be supplied to a battery 140 by adjusting an amount of current to be supplied to the battery charging device.

In particular, before the battery 140 is completely charged (a state where the battery 140 is being charged) when a remote control signal for adjusting the temperature of the vehicle is received or when temperature adjustment is scheduled, the battery charging control apparatus 100 according to an exemplary embodiment of the present invention adjusts a charging current based on the SOC of the battery, the amount of charging current, and the GPS information of a user terminal.

In particular, the battery charging control apparatus 100 may include an air conditioning control device 110, a battery charging device 120, and a control device 130.

The air conditioning control device 110 determines the indoor and outdoor temperatures of an electric vehicle and transmits information about the determined temperature to the control device 130. The air conditioning control device 110 adjusts the indoor temperature of the electric vehicle by operating an air conditioning device (e.g., an air conditioner or a heater) disposed in the electric vehicle under control of the control device 130.

The battery charging device 120 collectively manages overall states for charging the battery 140. The battery charging device 120 measures an amount of charging current while the battery 140 is charged, determines the SOC of the battery 140 and the estimated full-charging time, and transmits the determined result to the control device 130.

when a power supply signal of the air conditioning control device 110 is received from the control device 130 while the battery 140 is charged, the battery charging device 120 supplies a charging current to the air conditioning control device 110 based on the SOC of the battery 140, the amount of charging current, and the GPS information of the user terminal.

In other words, when the power supply signal is received while the battery 140 is charged, the battery charging device 120 does not use all the charging current for the battery charging but uses a portion of the charging current to operate an air conditioning device.

Afterwards, when the battery 140 is completely charged, the battery charging device 120 transmits a charging end signal to the control device 130 and is turned off.

Furthermore, after the battery 140 is completely charged and is turned off while a charging plug is plugged into the vehicle, when the power supply signal of the air conditioning control device 110 is received from the control device 130, the battery charging device 120 wakes up again and supplies a current input from the battery charging device 120 to the air conditioning control device 110. Herein, the battery charging device 120 may be connected with the charging station and may receive a current from the charging station.

The control device 130 is configured to control the operation of the battery charging control apparatus 100 overall. The control device 130 transmits information about the SOC of the battery 140, which is provided from the battery charging device 120, and temperature information (the indoor temperature information of the vehicle), which is provided from the air conditioning control device 110, to the telematics server 200.

Herein, the control device 130 may include a head device or an audio/video/navigation (AVN) device included in the vehicle.

Also, the control device 130 may output the power supply signal to the battery charging device 120 based on the GPS information of the terminal 300 and the remote control signal, which are received from the telematics server 200, and may control the air conditioning control device 110 through the battery charging device 120.

The telematics server 200 may store and manage information about the electric vehicle and the user. When the battery charging information and temperature information about the electric vehicle is received from the battery charging control apparatus 100, the telematics server 200 may transmit the corresponding information to the terminal 300, which is registered to correspond to the electric vehicle, by using a wireless/wired communication network.

In other words, the telematics server 200 may allow the user to check the SOC of the battery 140 of his or her electric vehicle and the indoor and outdoor temperatures of the vehicle by using the terminal 300.

In addition, when the remote control signal is received from the terminal 300, the telematics server 200 transmits the remote control signal to the battery charging control apparatus 100 of the electric vehicle corresponding to the terminal 300.

The terminal 300 is a terminal of the user (a service subscriber). The terminal 300 connects with the telematics server 200 by executing an application that operates in conjunction with the telematics server 200, and thus, the user may monitor the SOC of the battery and indoor and outdoor temperatures of the vehicle, and the GPS information of the terminal 300 may be automatically transmitted to the telematics server 200.

Also, the terminal 300 generates the remote control signal for remotely controlling the air conditioning control device based on an instruction of the user and transmits the remote control signal to the telematics server 200. The terminal 300 may include all terminals (e.g., a smartphone, a personal computer (PC), a personal digital assistant (PDA), and a portable media player (PMP)) that connect with and communicate with the telematics server 200 through a wireless/wired communication network (e.g., WEB, WIBRO, WIFI, or RF communication).

Figure 2:
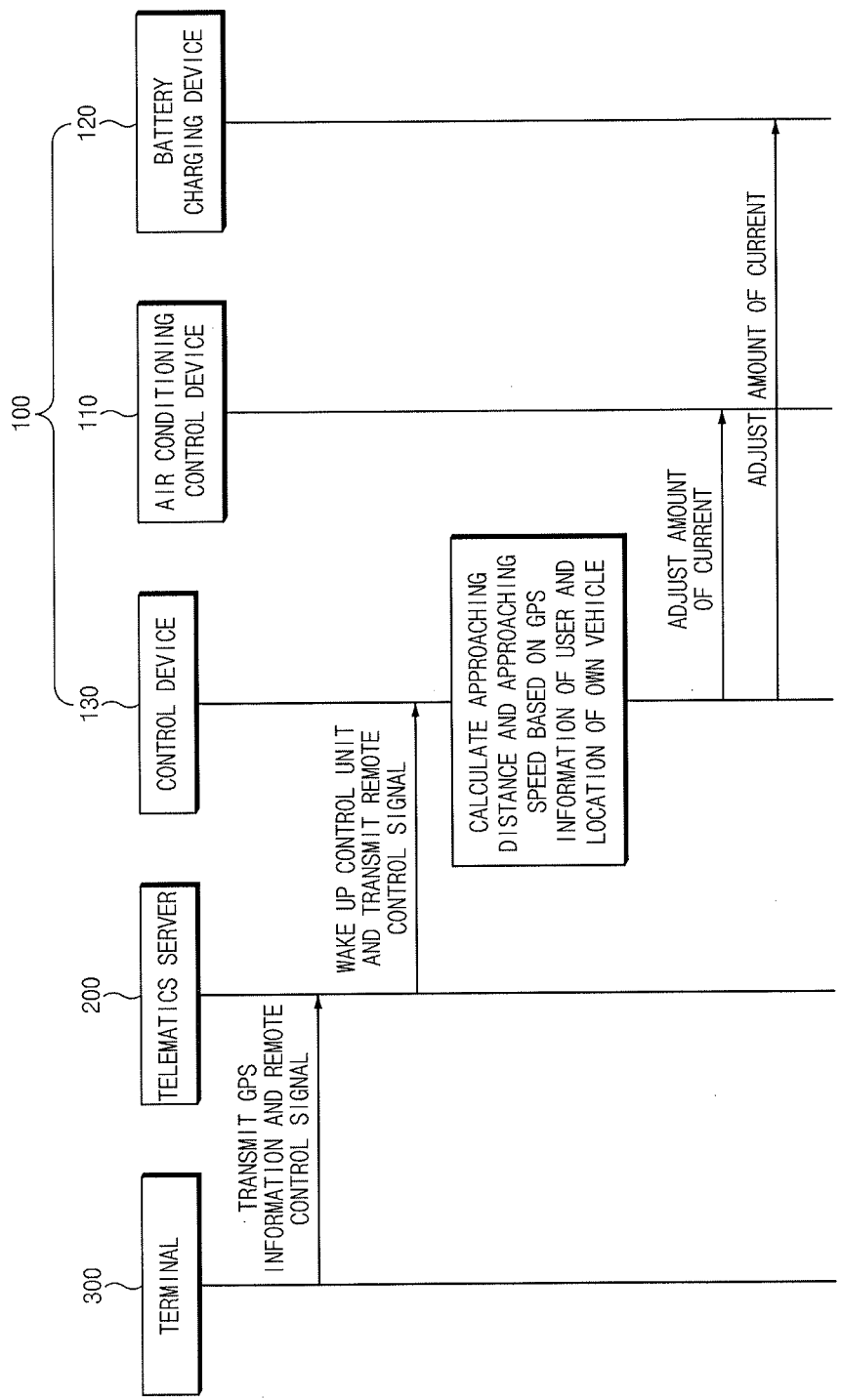
FIG. 2 is a drawing for describing a battery charging control method of a battery charging control apparatus, according to an exemplary embodiment of the present invention.

FIG. 2 is a drawing for describing a battery charging control method of a battery charging control apparatus, according to an exemplary embodiment of the present invention.

Referring to FIG. 2, when an electric vehicle enters a charging station, the battery charging control apparatus 100 disposed in an electric vehicle connects to the telematics server 200 through a wireless communication network based on a communication protocol that is defined in advance.

In the present case, the battery charging control apparatus 100 may communicate with the telematics server 200 through an access point (AP) or a mobile communication (e.g., CDMA, WCDMA, wireless broadband (WiBro)) repeater (e.g., a base station), which is disposed in the charging station, as the wireless communication method.

Generally, since the charging time is approximately 6 to 8 hours or more when the electric vehicle is slow-charged, a user may move to another place (e.g., his or her house or his or her office) without staying the charging station.

When the user remotely controls the air conditioning control device 110, GPS information of the terminal 300 of the user and a remote control signal are automatically transmitted to the telematics server 200. Herein, the GPS information of the terminal 300 of the user may indicate a GPS location of the terminal 300 of the user.

The GPS information of the terminal 300 of the user is transmitted from the terminal 300 to the telematics server 200 for a specific time period.

Herein, the terminal 300 of the user may transmit or receive the GPS information by using an application, which operates in conjunction with the telematics server 200, with user's agreement on the GPS information.

The telematics server 200 automatically wakes up the control device 130 of the battery charging control apparatus 100 of the vehicle. When the control device 130 wakes up, the telematics server 200 periodically transmits the GPS information of the terminal 300 to the control device 130. Herein, the telematics server 200 may directly control the air conditioning control device 110 of the battery charging control apparatus 100.

For example, the telematics server 200 may transmit the GPS information of the terminal 300 of the user to the control device 130 approximately every 10 sec.

Herein, the control device 130 does not wake up another multimedia system to reduce the power consumption. For example, the multimedia system may be a display system including a monitor, and the display system may be turned off.

The control device 130 compares the GPS information of the terminal 300 of the user, which is received from the telematics server 200, with information about a current location of an own vehicle. Herein, the control device 130 grasps the current location of the own vehicle in real time.

The control device 130 determines whether a distance between the user and the own vehicle decreases, by comparing the GPS information of the terminal 300 of the user, which is received for a specific time period, with the information about the current location of the own vehicle. Herein, the distance between the user and the vehicle may indicate a distance between a location based on the current GPS information of the terminal 300 of the user and the current location of the own vehicle.

In detail, the control device 130 may determine and store an approaching distance and an approaching speed between the user and the vehicle based on the received GPS information of the terminal 300 of the user and the current location of the own vehicle. The approaching distance may be determined to be classified into first to third steps.

For example, as in a method in which it takes five minutes when the distance (the approaching distance) between the user and the vehicle decreases from approximately 1 km to 500 m, it takes two minutes when the distance between the user and the vehicle decreases from approximately 500 m to 400 m, and it takes two minutes when the distance between the user and the vehicle decreases from approximately 400 m to 300 m, the control device 130 may classify a time period based on the distance between the user and the vehicle and may determine the approaching speed based on the classified distance and time.

The control device 130 may adjust an amount of current to be supplied to the battery 140 and an amount of current to be supplied to the air conditioning control device 110 through the battery charging device 120 based on the determined approaching distance and the determined approaching speed.

FIG. 3 is a drawing for describing a method of operating a battery charging control system, according to an exemplary embodiment of the present invention.

Referring to FIG. 3, the control device 130 compares a location(A) of GPS information of a terminal of a user, which is received from a telematics server, with a current location(B) of a own vehicle.

That is, as a distance between a GPS location(A) of the terminal 300 of the user and the current location(B) of the own vehicle decreases or as a speed at which the user approaches the own vehicle increases, the control device 130 increases an amount of current to be distributed to the air conditioning control device 110 and decreases an amount of current to be distributed to a battery.

In addition, as the distance between the GPS location(A) of the terminal 300 of the user and the current location(B) of the own vehicle decreases or as the speed at which the user approaches the vehicle increases, the control device 130 decreases an amount of current to be distributed to the air conditioning control device 110 and increases an amount of current to be distributed to the battery, in view of a time when the user boards the vehicle.

For example, when the distance between the GPS location (A) of the terminal 300 of the user and the current location (B) of the own vehicle is distance T0 that is greater than 500 m, the control device 130 may distribute approximately 20% of the total amount of current to the air conditioning control device 110. When the distance between the GPS location(A) of the terminal 300 of the user and the current location(B) of the own vehicle is distance T2 that is about 300 m, the control device 130 may distribute approximately 30% of the total amount of current to the air conditioning control device 110. When the distance between the GPS location(A) of the terminal 300 of the user and the current location(B) of the own vehicle is distance T4 that is about 200 m, the control device 130 may distribute approximately 40% of the total amount of current to the air conditioning control device 110.

Furthermore, as illustrated in FIG. 3, the control device 130 may differently adjust an amount of current, which is distributed to the air conditioning control device 110 and the battery 140, based on the approaching speed of the vehicle.

As described above, the present invention refers to a technology of adjusting the amount of current for charging a battery by using an approaching distance and an approaching speed between a user and the electric vehicle when the battery of an electric vehicle is charged.

In addition, the present invention refers to a technology to provide a user with convenience by using air conditioning equipment of the vehicle by adjusting a temperature in the vehicle, before the user boards the own vehicle.

The present invention refers to the technology of adjusting an amount of current for charging the battery by using an approaching distance and an approaching speed between the user and the electric vehicle when the user boards the electric vehicle.

In addition, the present invention refers to a technology to provide a user with convenience by using air conditioning equipment of the vehicle by adjusting a temperature in the vehicle, before the user boards a vehicle.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A battery charging control apparatus of an electric vehicle, the battery charging control apparatus comprising:
   an air conditioning control device configured to control an operation of an air conditioning device;
   a control device configured to receive global positioning system (GPS) information of a user terminal, which approaches a vehicle, and to generate charging control information based on a distance that is configured to be determined based on the GPS information of the user terminal and location information of the vehicle; and
   a battery charging device configured to control an amount of current to be supplied to a battery and the air conditioning control device, based on the charging control information.

2. The battery charging control apparatus of claim 1, wherein the battery charging device is configured to determine a state of charge (SOC) of the battery and an estimated full-charging time by measuring an amount of charging current while the battery is charged, and transmits the determined SOC to the control device.

3. The battery charging control apparatus of claim 1, wherein the battery charging control apparatus is installed in the vehicle and communicates with a telematics server by using a communication device included in the vehicle.

4. The battery charging control apparatus of claim 3, wherein the telematics server receives a remote control signal from the user terminal, and wherein the telematics server remotely controls the air conditioning control device.

5. The battery charging control apparatus of claim 1, wherein the control device generates the charging control information based on an approaching speed of the user terminal.

6. The battery charging control apparatus of claim 1, wherein as a distance determined based on the GPS information of the user terminal and the location information of the vehicle decreases, the control device increases an amount of current distributed to the air conditioning control device and decreases an amount of current distributed to the battery.

7. The battery charging control apparatus of claim 1, wherein as a speed at which the user terminal approaches the vehicle increases based on the GPS information of the user terminal and the location information of the vehicle, the control device increases an amount of current distributed to the air conditioning control device and decreases an amount of current distributed to the battery.

8. A battery charging control method comprising:
   receiving, by a control device, global positioning system (GPS) information user terminal through a telematics server;
   comparing the received GPS information of the user terminal with current location information of an own vehicle;
   determining an approaching distance between a location of the received GPS information of the user terminal and a current location of the own vehicle; and
   adjusting an amount of current to be supplied to a battery charging device and an air conditioning control device, based on the determined approaching distance.

9. The battery charging control method of claim 8, further comprising:
   before the receiving GPS information of a user terminal, waking up, by the telematics server, the control device when the telematics server receives GPS information of a user from the user terminal.

10. The battery charging control method of claim 8, wherein the telematics server controls the air conditioning control device.

11. The battery charging control method of claim 8, further comprising:
   when the approaching distance between the location of the received GPS information of the user terminal and the current location of the own vehicle is smaller than a distance, increasing an amount of current to be supplied to the air conditioning control device and decreasing an amount of current to he supplied to the battery charging device.

12. The battery charging control method of claim 8, further including:
   determining an approaching speed based on the received GPS information of the user terminal and the current location information of the own vehicle; and
   adjusting an amount of current to be supplied to the battery charging device and the air conditioning control device, based on the determined approaching speed.

13. The battery charging control method of claim 12, further including:
   increasing an amount of current supplied to the air conditioning control device and decreasing an amount of current supplied to the battery charging device, as the approaching speed at which the user terminal approaches the own vehicle increases based on the received GPS information of the user terminal and the current location information of the own vehicle.

* * * * *